United States Patent [19]

Thompson et al.

[11] Patent Number: 5,166,845
[45] Date of Patent: Nov. 24, 1992

[54] INTEGRATED READ/WRITE HEADS, FLEXURE ASSEMBLY AND AIR-BEARING STRUCTURE ON COMMON UNITARY SUBSTRATE

[75] Inventors: Herbert E. Thompson, Los Gatos; Duane G. Wallace, Jr., Santa Clara; Gilbert D. Springer, Fremont, all of Calif.

[73] Assignee: Iomega Corporation, Roy, Utah

[21] Appl. No.: 611,925

[22] Filed: Nov. 9, 1990

Related U.S. Application Data

[63] Continuation-in-part of Ser. No. 314,648, Feb. 22, 1989, abandoned.

[51] Int. Cl.⁵ ............................................. G11B 5/60
[52] U.S. Cl. ......................................... 360/103; 360/104
[58] Field of Search .................. 360/103, 104, 105, 106, 360/119, 122

[56] References Cited

U.S. PATENT DOCUMENTS

| | | | |
|---|---|---|---|
| 3,701,610 | 12/1970 | Buslik et al. | 360/105 |
| 4,286,297 | 8/1981 | Root et al. | 360/103 |
| 4,291,350 | 9/1981 | King et al. | 360/104 |
| 4,327,388 | 4/1982 | Wanek | 360/104 |
| 4,605,977 | 8/1986 | Matthews | 360/103 |
| 4,673,996 | 6/1987 | White | 360/103 |
| 4,792,875 | 12/1988 | Ohdaira | 360/104 |
| 4,819,094 | 4/1989 | Oberg | 360/104 |
| 4,841,396 | 6/1989 | Kawasaki | 360/104 |
| 4,984,118 | 6/1991 | Springer | 360/125 |

FOREIGN PATENT DOCUMENTS 62-145567 6/1987 Japan .

OTHER PUBLICATIONS

IBM Technical Disclosure Bulletin, vol. 26, No. 2, Jul. 1983, pp. 819–820.

Primary Examiner—David J. Severin
Attorney, Agent, or Firm—Woodcock Washburn Kurtz Mackiewicz & Norris

[57] ABSTRACT

An integrated read/write transducer and flexure support structure is provided for use with rotating magnetic media such as a hard disc drive. The integrated structure includes at least one magnetic pole structure integral with a unitary sheet of flexible magnetic material from which the flexure support is formed. A second magnetic pole is supported on the structure, together with conductive coils, to form an electromagnetic transducer. The integrated structure includes an air-bearing surface mounted for parallel motion with respect to adjacent magnetic media. A pattern of positive-pressure air-bearing rails and negative-pressure recesses provides an aerodynamically stable configuration designed to fly at a height of approximately 5 microinches above the moving magnetic media. Conductors and interconnect pads are provided on the magnetic sheet material substrate. The overall transducer and flexure support, including an external stiffener attached to the backside of the air-bearing surface, has a mass of less than about 15 milligrams.

29 Claims, 5 Drawing Sheets

INTEGRATED READ/WRITE HEADS, FLEXURE ASSEMBLY AND AIR-BEARING STRUCTURE ON COMMON UNITARY SUBSTRATE

BACKGROUND AND SUMMARY OF THE INVENTION

This application is a continuation-in-part of application Ser. No. 07/314,648, filed Feb. 22, 1989, now abandoned, entitled "Head-Flexure Assembly and Method for Making Same."

The invention relates generally to magnetic read/write head assemblies for interacting magnetically with magnetic media such as a planar disc which moves rapidly relative to the read/write head assembly, and more particularly to a read/write head assembly formed integrally with an air-bearing flying structure for supporting one or more read/write heads in close, non-contact proximity to moving magnetic media.

Rotating rigid disc magnetic recording systems typically employ magnetic head transducers which glide over the magnetic disc media on a cushion of air. The mounting or support structure which carries the transducers are termed "sliders." Sliders have air-bearing surfaces propelled off the surface of moving media by boundary air which moves with the media disc. Heretofore, such sliders have been made of non-conductive ceramic such as calcium titanate and mounted on a flexure arm. The air-bearing surface of a slider is aerodynamically designed to glide on the boundary air due to a pattern of raised rails and recesses which establish the "fly height" of the slider. Read/write head transducers are mounted on the air-bearing side of the slider, facing the moving media.

A slider assembly typically includes the ceramic slider and associated read/write heads, a support flexure arm, interconnection wires between the heads and external signaling devices, and any associated mounting hardware. That assembly is mounted on an arm which is movable over the surface of a rotating magnetic disc to position the slider adjacent selected tracks on the disc. Disc drives usually employ multiple discs which rotate together, spaced apart from one another on a single spindle. One slider assembly is provided for each magnetic recording surface in a disc drive. An example of a prior art slider assembly is shown in U.S. Pat. No. 4,286,297.

It is desirable in designing slider assemblies to minimize the "seek and settle time" required for the heads to come to rest in a stable position adjacent the moving magnetic media. Disc drives are designed to rapidly position and reposition the servo arm on which the slider assembly is mounted. As the servo arm rapidly jumps between concentric data tracks, the slider is pulled from one location to another. Each position jump causes a side motion as well as a disruption of the air flow around the slider. A certain finite time is required both to dampen side-to-side vibratory motion and to reestablish the fly height of the slider in the boundary air. It is clearly advantageous for a slider assembly to have a low mass in order to reduce seek and settle time.

A low-mass electromagnetic read/write head which is suitable for use with the new type of integrated slider and flexure assembly used in the present invention is described in U.S. patent application Ser. No. 07/294,351, filed Jan. 9, 1989, entitled "Flux-Concentrating, Non-Ghosting Electromagnetic Read/Write Head," now U.S. Pat. No. 4,984,118. Such low-mass heads can be fabricated using photolithographic techniques in a thin film of foil-like amorphous metal called Metglas ®.

Prior art slider assemblies generally position the read/write transducers at approximately 10 microinches from the magnetic media, with the overall range of typical devices being 5-to 25-microinches (a microinch is 1 millionth of an inch). It is desirable for the air-bearing surface of a slider to fly as close to the media as possible, without touching the media. A low fly height eliminates spacing losses, producing better resolution of data on the media. Because read/write signal strength is dependent on the distance between the magnetic imaging gap in the read/write head, close spacing substantially improves transducer performance. For example, at a fly height of 5 microinches, a 1 microinch increase in spacing results in a 20% drop in signal strength.

It is also important for the spacing between the slider and media disc to be invariant from the innermost to the outermost diameter data tracks. Such fly height stability is possible only with sliders which employ a negative-pressure air-bearing configuration in which a balance of above-ambient and below-ambient pressure regions exist between the slider and moving media. Negative-pressure air-bearing sliders are known, but are not favored in the industry in part because ceramic-type sliders develop undesirable tribo-electrification, which is the accumulation of static electric charge due to air friction and other causes. Tribo-electric charge buildup on conventional ceramic-type sliders can generate damaging discharges both during manufacturing and during operation of the slider assembly. Such discharges can destroy thin film heads and adjacent magnetic media. Another problem associated with tribo-electrification is the accumulation of charged dust or debris particles in and around negative pressure recesses in the air-bearing surface. Such accumulations degrade the flight characteristics of the slider. Also, due to the close spacing between slider and media, debris buildup can result in burnishing of both the slider and media. Tribo-electrification is one of the reasons negative-pressure air-bearing architecture is uncommon in production sliders.

Slider assemblies are currently configured to rest the slider upon the magnetic media disc when the disc is not turning, allowing the slider to "fly above" the disc after it begins to turn. Such a mounting system is termed positive loading. With positive loading, a slider is biased toward the disc; its air-bearing surface rides above the disc only after the viscous air currents are developed by rotation of the disc. The disadvantage of positive loading is that the heads and slider may stick to the disc when it has stopped due to formation of a "vacuum" weld between the opposed precision flat surfaces of the slider and disc. The stiction force required to break a vacuum wield imposes high-power starting requirements for the spindle motor, contributing to the cost and power requirements of the disc drive. Even without vacuum welds, it is undesirable for the slider to contact the magnetic media at any time since it tends to produce flaws in the disc.

It would be advantageous to provide a slider assembly and flying support structure which improves upon prior art slider assemblies. In particular, it would be advantageous to provide a slider assembly and support structure which supports electromagnetic read/write heads on an air-bearing surface with a minimal overall mass, to optimize seek and settle time, with an aerodynamic architecture permitting a stable fly height as close as possible to a moving media disc, and without frictional contact between the slider and magnetic media. It would be particularly advantageous to have a flying support structure which can be fabricated to a high degree of accuracy within a thin, foil-like sheet of amorphous metal such as Metglas ®.

It is an object of the present invention to provide an integrated magnetic head and flying support structure for writing and retrieving magnetic images on adjacent planar magnetic media moving relative to the structure.

It is another object of the invention to provide such an integrated head and flying support structure which has a very low mass relative to prior art slider assemblies and which is capable of functioning at a lower fly height than most prior art slider assemblies.

It is another object of the present invention to provide an integrated read/write head and flying support structure in which the head gap between the magnetic poles, transducer coils and associated conductors, as well as the air-bearing architecture and flexure support, are all fabricated within a unitary sheet of thin, flexible magnetic material such as Metglas ®.

Accordingly, the invention provides an integrated read/write structure for magnetic media which comprises a sheet of flexible magnetic material formed with at least one magnetic pole, an air-bearing flying structure, and flexure means all integrated within the magnetic sheet material. Means are also provided for defining at least one second magnetic pole, joined to the magnetic sheet material, which is in operative association with the at least one pole integral with the flexible sheet material. Electrical coil means are also provided in the magnetic sheet material, in operative association with the magnetic poles, to form an electromagnetic transducer.

In its preferred form, the invention includes a sheet of thin magnetic material from which portions are removed to form a pattern within the sheet defining an air-bearing platform supported by a beam flexure structure. The beam flexure includes at least one primary beam extending longitudinally from a mounting end of the integrated structure, where the structure is attached to a servo arm or the like, to a free, unattached end. A second, parallel beam extends from adjacent the free end of the structure to the air-bearing platform on which one or more electromagnetic read/write head transducers are formed. Electrical conductors for interconnecting the read/write head transducer with external devices are formed in the body of the magnetic sheet material by etching a conductor channel into the beams of the flexure structure. A pair of electrically isolated conductors are then formed in the conductor channel and the channel is covered with an EMI interference shielding material. As such, the invention provides a complete, intergraded read/write head and flexure support structure in a single, thin foil-like substrate.

The invention provides a transducer-flexure assembly with an air-bearing surface on which at least one transducer is integrally formed. The air-bearing surface is supported by the flexure assembly so as to be rotationally stiff about a first axis perpendicular to the adjacent magnetic recording media, rotationally pliant about a second axis parallel to the media, rotationally pliant about a third axis which is parallel to the media and perpendicular to the second axis, translationally stiff along the second and third axes, and translationally pliant along the first axis. The invention also provides a method of forming an integral transducer-flexure assembly in accordance with the present invention.

DETAILED DESCRIPTION OF THE PREFERRED EMBODIMENT

Figure 1:
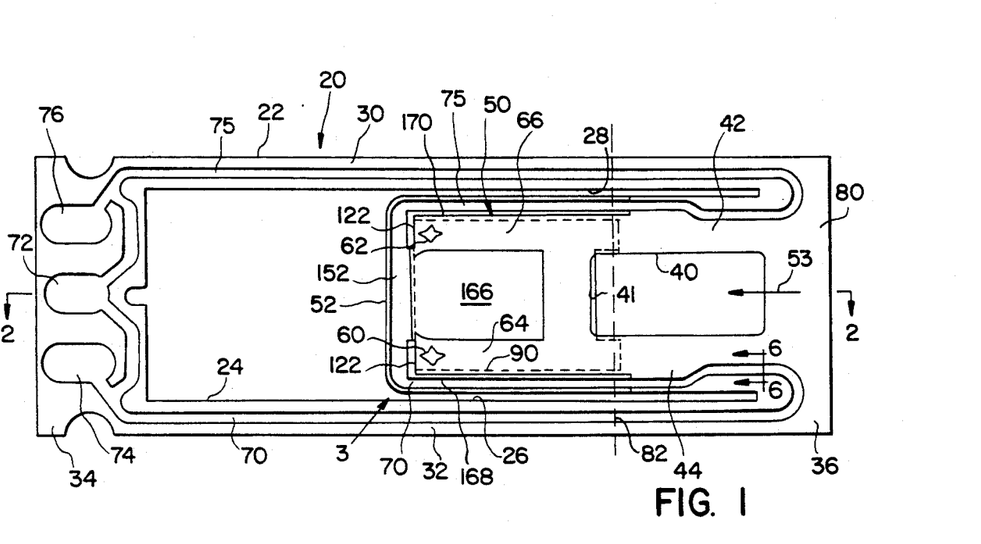
FIG. 1 is a plan view of an integrated read/write head and flying support structure showing the side of the structure which faces and interacts with adjacent magnetic media.

Referring to FIG. 1, a unitary, integrated read/write structure for magnetic media is shown generally at 20. Referred to alternatively as the integrated structure, read/write structure or integrated read/write and flexure support assembly, integrated structure 20 is formed within a unitary sheet of flexible magnetic material 22. Magnetic sheet material 22, also referred to as the frame of the device, is a thin, foil-like amorphous metal marketed under the registered trademark Metglas ®, manufactured by Allied Chemical Company. Metglas ® has extremely high magnetic permeability, as well as strength and hardness, which makes it ideal for the integrated head and flying support structure of the present invention. Metglas ® sheet 22 is preferably approximately 30-microinches thick, or in the range of between 20-microinches and 40-microinches thick, having an overall longitudinal length, in its longest dimension, of less than ½-inch and a width of less than ¼-inch. Two particular types of Metglas ® which are satisfactory for the integrated structure of the present invention are marketed as "2826 MB" Metglas ® and "2605 SE" Metglas ®.

Metglas ® sheet 22 is the substrate on which the remainder of the integrated read/write structure and flexure support of the present invention is fabricated. The Metglas ® sheet is also referred to as a sheet of spring material, flexible sheet material, magnetic sheet material or a sheet of flexible magnetic material. Hereinafter Metglas ® sheet 22 will be referred to as substrate 22. The fabrication of electromagnetic read/write heads and associated structures in a sheet of Metglas ®, has been previously demonstrated. Examples of structures formed in Metglas ® are found, for example, in U.S. Pat. No. 4,494,125, U.S. Pat. No. 4,503,439, and U.S. patent application Ser. No. 07/294,351, filed Jan. 9, 1989, now U.S. Pat. No. 4,984,118. The latter patent application, entitled "Flux-Concentrating, Non-Ghosting Electromagnetic Read/Write Head," is assigned to the assignee of the present application and shows a read/write head fabricated in a substrate of Metglas ®. Known techniques for creating structures within a Metglas ® substrate include photolithographic masking and etching techniques to create patterns of voids and windows in which conductors or other added structures can be formed. The structure of the integrated read/write and flexure assembly of the present invention is fabricated in substrate 22 using such photolithographic methods, as well as other techniques known to those skilled in the art such as electrodeposit. Steps in a preferred method of fabricating a integral transducer-flexure assembly, in accordance with the present invention, will employ those known techniques to form the various structures described below.

Referring to FIG. 1, substrate 22 includes a pattern of removed sheet material which defines several of the principal structural elements of the final integrated structure 20. One area of removal is a central opening 24, which extends entirely through substrate 22 and includes elongated narrow branch slots or openings 26, 28. Opening 24 and narrow branch openings 26, 28 together define a pair of longitudinal-extending primary beams 30, 32 which extend from a first mounting end portion 34 of the substrate 22 (and the integrated structure 20) to a second free end portion 36. A second, smaller opening 40 extending entirely through substrate 22 defines a secondary pair of beams 42, 44 extending longitudinally between opening 40 and narrow side openings 26, 28. Secondary beams 42, 44 are generally parallel with primary beams 30, 32. Opening 40 is also referred to as a bleed slot.

Disposed generally centrally relative to substrate 22 is an air-bearing flying structure 50 extending generally from the leftmost edge 41 of opening 40 (as viewed in FIG. 1) to the trailing edge 52 of the air-bearing flying structure, at the edge of opening 24. Reference to a "trailing" edge of several components of the integrated structure means the edge which trails the rest of the structure in relation to the flow of boundary air adjacent the structure. In FIG. 1, the direction of air flow across integrated structure 20 is shown by arrow 53. Thus, the trailing edge 52 of air-bearing platform 50 is the leftmost edge of the platform. The air-bearing flying structure, also referred to as the air-bearing slider or air-bearing platform 50, is surrounded on three sides by opening 24 and elongated branch openings 26, 28, and on the fourth side by beams 42, 44 and opening 40.

A pair of electromagnetic read/write head structures 60, 62 are supported on air-bearing platform 50 at the trailing edge (i.e., the leftmost edge as viewed in FIG. 1) of a respective pair of air-bearing rails 64, 66. Air-bearing rails 4, 66 are surrounded by a pattern of recessed or thinned Metglas ®. Heads 60, 62, thus formed, have spaced apart poles which define a small electromagnetic gap therebetween which is co-planar with the air-bearing rails on which the poles are formed.

A pattern of electrical conductors formed in a channel 70 within the body of substrate 22 interconnects head 60 with interconnect pads 72, 74 located at the first mounting end 34 of the substrate 22. A corresponding pattern of electrical conductors in another channel 75 interconnects head 62 with pads 72, 76 at mounting end 34 of the substrate. Conductor channels 70, 75 extend along the primary and secondary beams and include a pair of copper conductors formed within an etched conductor cavity in a manner so as to electrically isolate the conductors from the surrounding substrate. Formation of conductors 70, 75 is described below.

The pattern of openings 24, 26, 28 and 40 through substrate 22 forms a flexure means for supporting an air-bearing flying structure 50 in the center of the structure. The second or free end 36 of integrated structure 20 includes a cross leg 80 which interconnects primary beams 30, 32 adjacent free end 36. Secondary beams 42, 44 extend from cross leg 80, between primary beams 30, 32, part way toward mounting end 34 of sheet 22. As such, secondary beams 42, 44 extend from the cross leg 80, at a point adjacent free end 36 of primary beams 30, 32, respectively, to air-bearing platform 50. The portion of the integrated structure including secondary legs 42, 44 and air-bearing platform 50 is alternatively referred to as a flexible arm supported in cantilever fashion within central opening 24. The flexible arm formed by beams 42, 44 and platform 50 has a proximal end segment where it is affixed to cross leg 80, at free end 36 of substrate 22. Air-bearing platform 50 is alternatively referred to as the distal end segment of the flexible arm.

The flexure of beams 30, 32, 42, 44 and resilient relative movement between the beams around their integral interconnection adjacent free end 36, provides flexure support for air-bearing platform 50. The configuration of the beams also allows platform 50 to move in a generally parallel orientation toward and away from a planar media surface. As such, the beams form a parallel-beam mounting system which permits parallel motion for air-bearing platform 50.

Figure 2A:
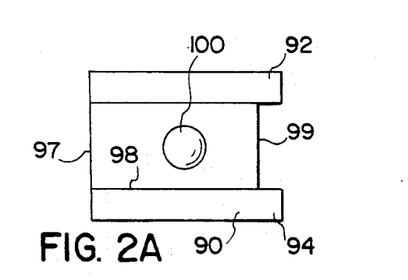
FIG. 2A is a plan view of the stiffener which is attached to the integrated read/write and support structure shown in FIG. 1, as viewed from the opposite side of the structure shown in FIG. 1.
Figure 2B:
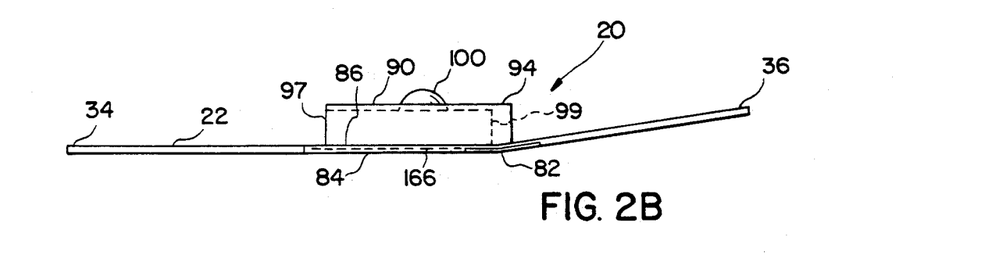
FIG. 2B is a partial side elevation taken along line 2—2 of FIG. 1 showing the integrated structure together with the stiffener of FIG. 2A attached to the side of the structure opposite to that shown in FIG. 1.

To help intercept the flow of air adjacent a magnetic media disc, a bend 82 is formed across substrate 22, as shown in FIG. 2. Bend 82 causes free end 36 of Metglas ® sheet 22 to be slightly raised, relative to adjacent planar magnetic media (not shown), making the free end slightly higher than mounting end 34. A bend angle of 10° is suitable for bend 82. The bend extends across primary beams 30, 32 and generally along the line where secondary beams 42, 44 join air-bearing platform 50.

Referring to the side or surface of air-bearing platform 50 shown in FIG. 1 as first surface 84, air-bearing rails 64, 66 are formed on the first surface of the platform. First surface 84 is also the surface which faces toward adjacent magnetic media for reading and writing magnetic images on the media by means of head transducers 60, 62. The opposite side or surface of air-bearing platform 50 is referred to as the second surface 86. FIGS. 2A and 2B illustrate a stiffener means which is affixed to second surface 86 of air-bearing platform 50. Stiffener 90 is shown in plan view in FIG. 2A and side elevation, attached to substrate 22, in FIG. 2B. Stiffener 90 is formed of a ceramic composition such as calcium titanate and preferably includes a pair of short legs or extensions 92, 94 which correspond in spacing and are slightly narrower than secondary beams 42, 44. Legs 92, 94 extend the length of stiffener 90 and form a central depression 95 extending the length of the stiffener (see FIG. 9). The underside of stiffener 90 is lapped flat to one light band (about 10 microinches) or less and provides a means for stiffening the air-bearing surface on the other side of platform 50.

Stiffener 90 is attached to the second side 86 of air-bearing platform 50 by a non-volatile adhesive applied to the underside of the stiffener. The upper side of stiffener 90 (as viewed in FIG. 2), within depressed channel 98 (see FIG. 7), includes a centrally disposed raised button 100 which is preferably half spherical in shape. Stiffener 90 is preferably attached to the integrated read/write and flying support structure of the present invention as a final step in the fabrication process. The stiffener serves several functions, including maintaining the flatness of the air-bearing surface, and contributing to certain aerodynamic flight characteristics of the final structure.

Figure 3:
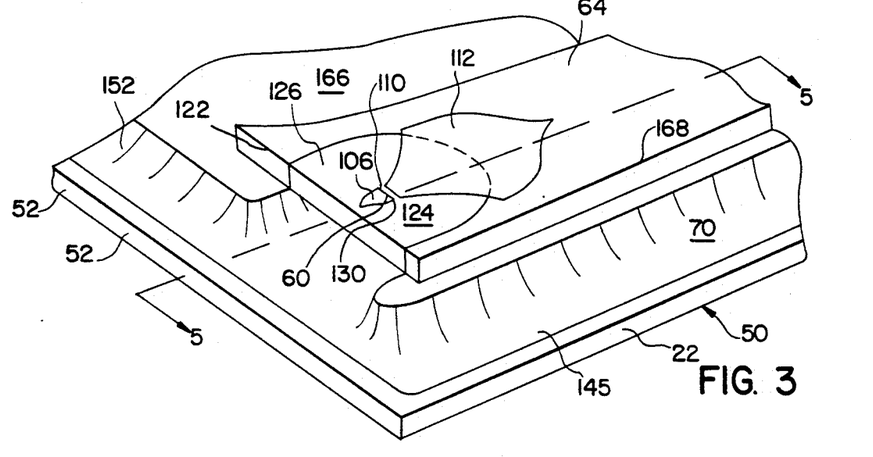
FIG. 3 is a partial, perspective view on an enlarged scale showing a portion of the air-bearing flying structure from the approximate position shown with arrow 3 in FIG. 1, illustrating the terminal or trailing end of one of the air-bearing rails formed on the air-bearing flying structure, and including an integrated head formed therein.
Figure 4:
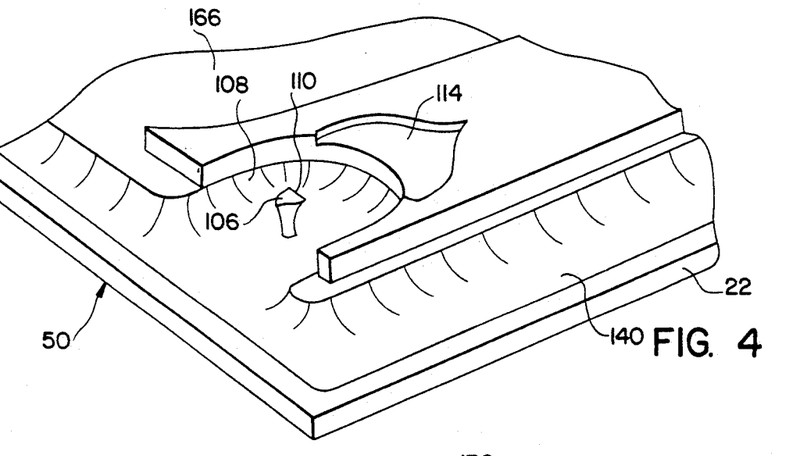
FIG. 4 is a partial, perspective view as in FIG. 3 illustrating those portions of the air-bearing rail, integrated head structure and surrounding air-bearing platform, formed of the magnetic sheet material from which the integrated structure is fabricated, all other structures and components having been removed for illustrative purposes.

FIGS. 3 through 6 illustrate the fabrication of electromagnetic read/write heads 60, 62 of the integrated structure, as well as the associated conductors 70, 75. Representative head 60 will be used to illustrate the structure of the heads as well as some of the architecture of air-bearing platform 50. FIG. 3 illustrates the final overall structure of one corner of air-bearing platform 50, near the trailing edge of air-bearing rail 64. FIG. 4 shows the shape of the Metglas ® substrate, with other elements removed for illustrative purposes. The configuration of Metglas ® substrate 22 shown in FIG. 4 does not necessarily represent a step in the fabrication process, since the formation of raised rail 64, the adjacent lowered areas, and the various depressions and channels formed in the Metglas ® substrate will be formed over several photolithographic and etching steps. The configuration of depressions shown in FIG. 4 underlies the final construction of the completed integrated structure. It is useful in visualizing the structure and location of the read/write heads and associated conductors.

Figure 5:
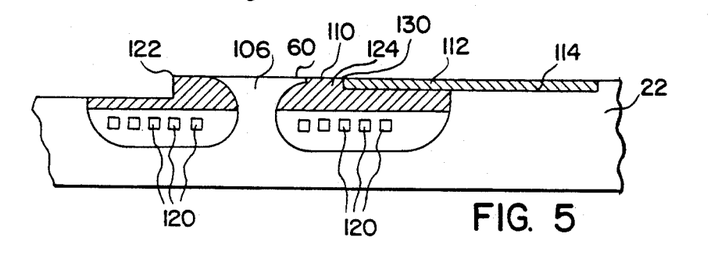
FIG. 5 is a side cross-sectional view on an enlarged scale of the integrated head structure shown in FIG. 3, taken along line 5—5 of FIG. 3.

Head 60 includes a first magnetic pole 106 which is formed of Metglas ® integral with substrate 22. First pole 106 is formed by removing surrounding Metglas ® using photolithographic and masking techniques to produce a generally triangular-shaped island of Metglas ® surrounded by a cavity. FIG. 5 shows the island of Metglas ® 106 and cavity 108 in cross-section. Pole 106 defines one edge 110 of an electromagnetic read/write gap across which magnetic lines of force extend when writing on magnetic media. The other half of the gap is provided by a second magnetic pole 112 joined to Metglas ® sheet 22. Second pole 112 is generally horn-shaped. Both first pole 106 and second pole 112, as well as cavity 108 and the other described features of head 60 are in accordance with the invention described in U.S. Pat. No. 4,984,118, entitled "Flux-Concentrating, Non-Ghosting Electromagnetic Read/Write Head" (Ser. No. 07/294,351, filed Jan. 9, 1989. Second pole 112 fits and is affixed within a depressed shelf 114 in the Metglas ® substrate, as shown in FIGS. 4 and 5.

Figure 7:
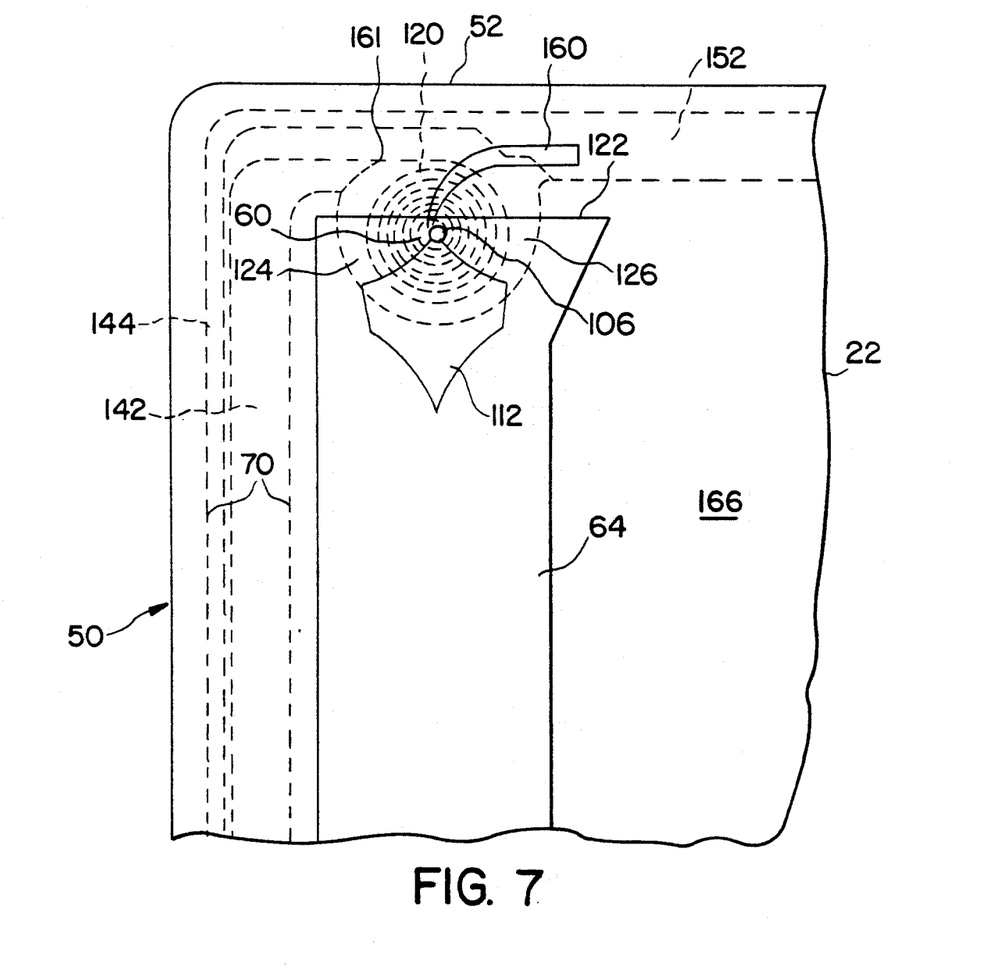
FIG. 7 is a partial top plan view of the region of the air-bearing flying structure shown in FIG. 3 illustrating the poles and associated conductors used in the integrated structure of the present invention.

FIGS. 5 and 7 show the electrical coil 120 which surrounds pole 10 within cavity 108. Coil 120 is formed by photolithographic masking and electrodeposit techniques within a passivation layer of photoresist which generally fills a portion of the cavity.

The actual steps in forming coil 120 includes placing a bed of photoresist in cavity 108 to a level above coil 120. Through conventional photolithographic masking techniques, a helical channel is formed in the photoresist and copper conductors or the like are electrodeposited in the channel. Additional passivation material is then built up to fill or partially fill cavity 108. The exact depth to which cavity 108 is filled is a matter of design choice, although it should be sufficient to cover conductors 120. If the heads are fabricated in accordance with techniques previously disclosed in patent application Ser. No. 07/294,351, filed Jan. 9, 1989 entitled "Flux-Concentrating, Non-Ghosting Electromagnetic Read/Write Head" or in patent application Ser. No. 07/531,832, filed Jun. 9, 1990 entitled "Unitary Read-Write Head Array for Magnetic Media," photoresist will completely fill cavity 108, after which portions are etched away to create the final architecture shown in FIGS. 3 and 5.

Following the formation of coil 120, a subsequent etching step creates shelf 114, which extends into air-bearing rail 64. Second pole piece 112 is installed in shelf area 114. Second pole 112 has a horn-like shape shown in FIGS. 3 and 4. The second pole piece partly overlies cavity 108. Second pole gap edge 130 closely approaches the facing straight-line gap edge 132 of first pole 106. Second pole gap edge 130 overlies a portion of coil 120 and provides one side of a read/write head gap which produces and retrieves magnetic images on adjacent magnetic media. The top surfaces of first pole 106 and second pole 112 are co-planar with the top of air-bearing rail 64, preferably being machined or lapped flat at the conclusion of the fabrication process.

Figure 6:
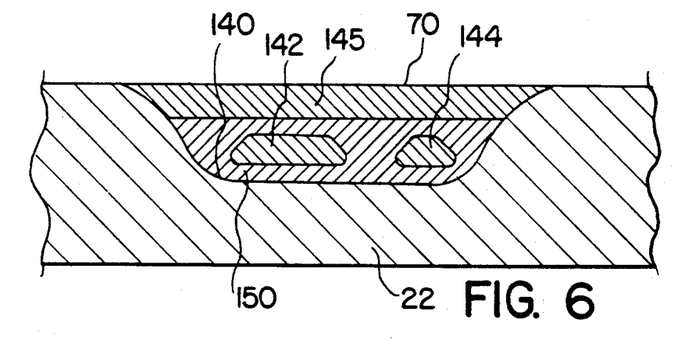
FIG. 6/ is a side, cross-sectional view of one of the conductor channels, taken along line 6—6 in FIG. 1, the conductor channels extending between interconnection pads on the structure and the electrical transducer coils associated with the head structures.

Conductors in channel 70 for interconnecting coil 122 with the interconnection pads at mounting end 34 of the integrated structure will generally be formed at the same time as coil 122. A cross-sectional view of the conductors is shown in FIG. 6. Conductors 70 include a pair of electrically isolated continuous conductors provided in a channel 140 etched into Metglas ® substrate 22 (FIG. 4). The method of forming channel 140 and separate conductors 142 and 144 is generally the same as for coil 120. The copper conductors 142, 144 are formed in a bed of photoresist or a similar passivation material 150 which is laid down in channel 140 in the same manner as in the formation of coil 120. Photoresist is built up to a point below the first surface 86 of air-bearing platform 50 and a covering layer of a nonmagnetic low conductivity material such as nickel phosphorous is laid down over the conductor channel. Nickel phosphorous is also laid down over portions of coil 120, shown as layer 145. It has been found that nickel phosphorous provides suitable electromagnetic or EMI shielding for the conductors. It also tightly encloses the channels and coil cavity. Nickel phosphorous forms a good metal-to-metal bond with Metglas® and is therefore not subject to detachment even with repeated flexing of the materials. FIGS. 3, 5 and 7 illustrate the various locations where a nickel phosphorous overlay is used, including triangular sections 124, 126 at the trailing end 122 of rail 64, and overlying conductor channel 70, coil 120 and an interconnect conductor 152 which extends between head 60 and head 62 on platform 50.

FIG. 7 illustrates a plan view of a portion of air-bearing platform 50 and head structure 60, showing (in phantom) the interconnection between conductors 142, 144, 152 and coil 120. The end of broad conductor 142 is electrically connected to coil 120 at 161 and extends down the side of platform 50, along secondary beam 44 (see conductor channel 70 in FIG. 1) around cross-member 80 and along primary beam 32 to interconnect pad 74 at mounting end 34 of the substrate. The other end of coil 120 is attached to cross-over interconnect conductor 152 by means of a center tab conductor 160 placed within the passivation layer overlying coil 120. Cross-over interconnect conductor 152 is, in turn, connected to narrow conductor 144 and extends along the edge of platform 50, along secondary beam 44 (see FIG. 1) around onto primary beam 32 to interconnect pad 74. Narrow conductor 144 is able to accommodate the same signal as conductor 142 because it offers a split pathway for current from the center tap of the coil surrounding either head 60, 62 to center interconnect pad 74. In contrast the wide conductor 142 provides a single electrical path to the coil surrounding head 60. A mirror image of the interconnection to head 60 is provided between head 62 and pads 72, 76 along conductor path 75.

The final architecture of air-bearing platform 50 includes raised air-bearing rails 64, 66 which are separated by and define a stepped-down recess 166 between the rails. Recess 166 extends into Metglas® substrate 22 and is used to partially define and control the flight characteristics of the air-bearing platform. The stepped-down area of recess 166 is formed by etching away a portion of platform 50. The stepped-down area also extends around each air-bearing rail 64, 66 and adjacent trailing end 52 of platform 50. In the preferred embodiment, stepped-down recess 166 and the other stepped-down areas are approximately 4.5-microinches in depth, relative to the air-bearing rails. That means that the thickness of platform 50 is less than the thickness of the rest of substrate 22 by approximately 4.5-microinches, except for air-bearing rails 64, 66. The stepped-down area also extends along both sides of platform 50, along the side edges of the rails, including side edge 168 of rail 64 and side edge 170 of rail 66 (see FIG. 1). The stepped-down area extends slightly into secondary beams 42, 44 terminating forward of bend line 82 (to the right, of the bend line as shown in FIG. 1).

Figure 8:
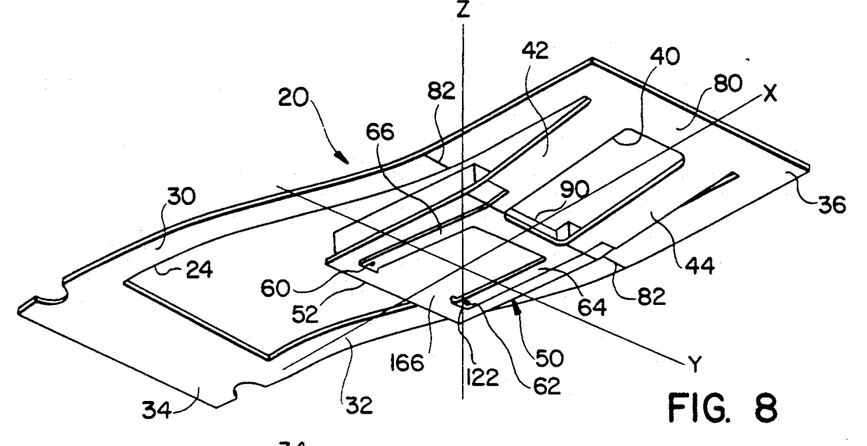
FIG. 8 is a perspective view of the integrated structure of FIG. 1, showing the side of the structure illustrated in FIG. 1, in its completed form when positioned on a support arm and in flying relationship to adjacent magnetic media (not shown).
Figure 10:
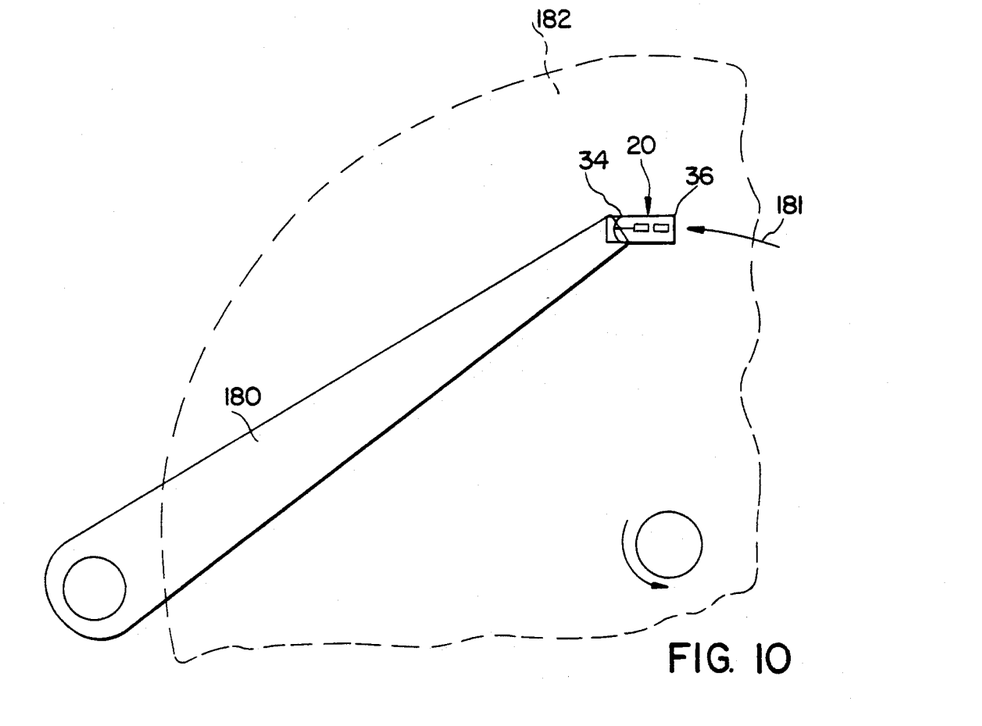
FIG. 10 is a schematic top plan view of a portion of a disc drive illustrating a support arm and an integrated read/write support structure mounted on the end of the support arm.

FIG. 8 illustrates the overall shape and orientation of a read/write head and flying support structure in operation adjacent a moving media disc, as viewed in perspective from below. Assuming mounting end 34 is attached to a suitable positioning arm 180, as shown in FIG. 10, the free end 36 of the structure is supported in cantilever fashion overlying a magnetic planar magnetic media disc 182 (the disc is not shown in FIG. 8, see FIG. 10). Referring to FIG. 8, the boundary air flowing adjacent the media disc is in the general direction of arrow 181. Integrated structure 20 includes a pair of positive pressure air-bearing rails 64, 66 which serve as positive pressure or above-ambient pressure-producing rails and which ride upon an air-bearing created by the viscous movement of air under integrated structure 20. Recess 166 forms a negative pressure recess between the positive pressure rails, which creates a counterbalancing force to stabilize the fly height of the air-bearing platform 50. Secondary beams 42, 44 and the upturned free end 36 created by bend 82 direct air beneath air-bearing platform 50. Opening 40 between secondary beams 42, 44 acts as a bleed slot to direct some of the air flowing over the surface of the recording medium away from the underside of the air-bearing platform. Bleed slot 40 instead directs some of the air over stiffener 90, thus controlling the quantity of air passing beneath platform 50.

Figure 9:
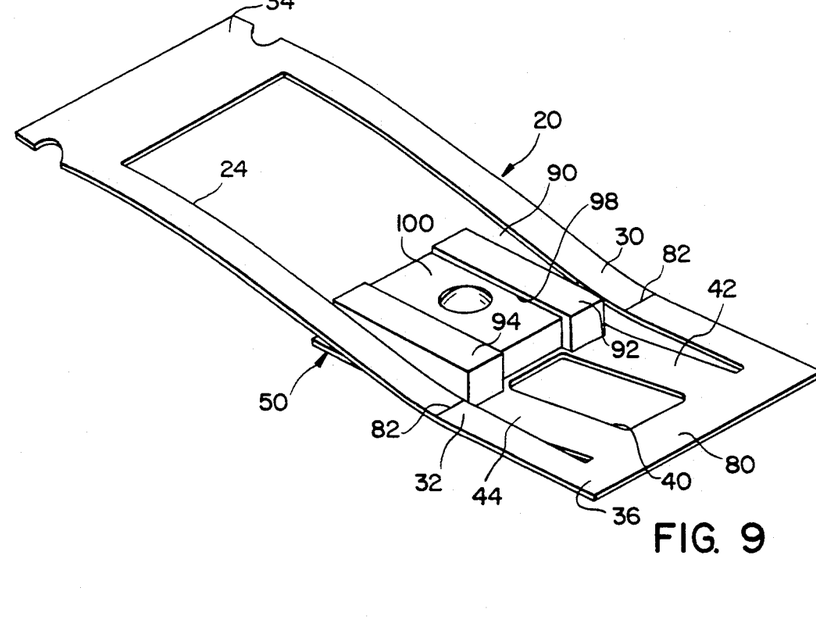
FIG. 9 is a perspective view of the integrated structure shown in FIG. 8 showing the opposite side of the structure.

FIG. 9 illustrates the general configuration of integrated structure 20 as viewed from above, when overlying moving magnetic media (not shown). Primary beams 30, 32 and secondary beams 42, 44 cooperate to provide a flexure support for air-bearing platform 50 which permits movement of the platform toward and away from the media while maintaining generally parallel orientation with respect to the media.

Figure 11:
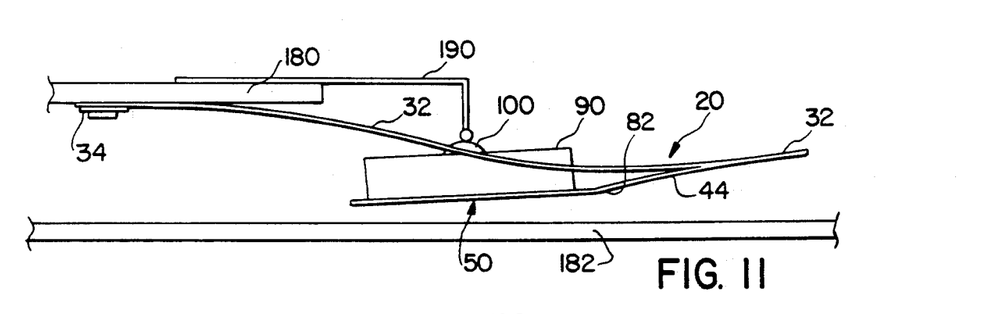
FIG. 11 is a side elevation of the structure of FIGS. 8 and 9, together with a portion of a disc drive servo arm, an associated positioner means, and magnetic media adjacent the integrated read/write structure, with the media stationary.
Figure 12:
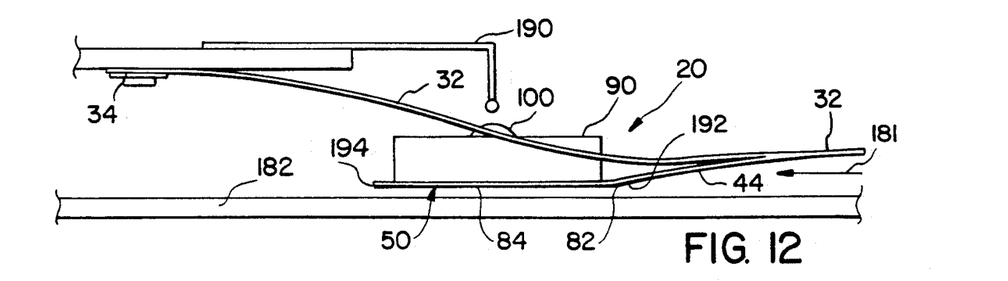
FIG. 12 is a partial side plan view as in FIG. 11 showing the position of the integrated structure on an associated positioning arm when the magnetic media is moving.

FIGS. 11 and 12 illustrate the "self loading" feature of the integrated structure which positions the air-bearing platform relative to media 182. Integrated air-bearing flying structure 20 is designed to have a negative loading, in which its natural position is spaced from the adjacent media, as opposed to a positive loading which tends to urge the air-bearing structure down onto the media surface. Platform 50 is urged upwardly by the flexure means formed by spring beams 30, 32, 42, 44. With negative loading, air passing around the air-bearing platform produces sufficient negative pressure in the region adjacent recess 166 on the first air-bearing surface of platform 50 to move the platform downwardly toward media 182. With negative loading, the air-bearing slider surface does not touch the media at any time. It is necessary, however, for the "rest" position of the air-bearing platform, when the media is stopped, to be within the "capture range" in which the viscous boundary air will draw the platform downwardly to its final fly height. FIGS. 11 and 12 illustrate a suitable means for properly positioning platform 50 by means of a positioner 190 which acts against raised button 100 on stiffener 90. FIG. 11 illustrates the rest position of platform 50, when the relative motion of media 182 is stopped or is insufficient to produce an airflow which urges platform 50 closer to the media. In the platform's rest position, positioner 190 prevents platform 50 from springing upwardly too far from the media. Instead, platform 50 remains within the "capture range" wherein enough boundary flow will be present to draw the platform downwardly to its final fly height shown in FIG. 12.

The motion of platform 50 parallel to media 182 results from the configuration of the flexure means provided by beams 30, 32, 42, 44. Referring to FIG. 8, platform 50 is rotationally stiff about the illustrated Z axis and pliant about the illustrated X and Y axes, and translationally stiff along the X and Y axes and pliant along the Z axis. Because of the presence of stiffener 90, the first surface of platform 50, including air-bearing rails 64, 66, remains flat and generally parallel to the media at all times.

During operation of the air-bearing flying structure, air flow is in the direction of arrow 181. As air generated by viscous flow in a boundary region adjacent disc 182 passes beneath air-bearing platform 50 the leading edge of the platform, at 192, begins to pressurize the air where bend 82 is formed in the substrate. The trailing edge of the substrate is at 194 in FIG. 12. Air passing between platform 50 and media 182 is above-ambient in the region adjacent the air-bearing rails 64, 66 (see FIG. 8). As such, rails 64, 66 produce above-ambient air pressure beneath the platform to urge the platform away from the media. The partially-removed areas around and adjacent the rails, including central recess 166, provide below-ambient air pressure in a negative pressure region adjacent air-bearing platform 50, which tends to counteract the positive pressure regions and help control the fly height of the platform and associate read/write heads 60, 62. The below-ambient air pressure tends to draw or move platform 50 toward media 182. An additional negative pressure region exists in the recessed area just past the trailing edge 122 (FIG. 5) of each air-bearing rail. The negative pressure there results from the sudden drop in air pressure as the air flows passed the trailing end 122 of the rail. That tends to draw the trailing end of the rail slightly downwardly toward the media, decreasing the distance between the head structures 60, 62 and the media, which improves the data resolving ability of the read/write head transducers.

The overall shape and configuration of beams 30, 32, 42, 44, together with the raised forward end 32 created by bend 82 directs the air flow adjacent moving magnetic media under and around platform 50 to optimize the flight characteristics of the entire structure. The pattern of air-bearing rails and negative-pressure recesses is structurally configured so as to create a converging wedge beginning at the leading edge 192 of air-bearing platform 50. The converging wedge is operable to direct some of the air flowing adjacent the surface of recording medium 182 under air-bearing surface 84 of platform 50. The air flow is directed to the converging wedge at leading edge 192, in part, by the underside of secondary beams 44. Bleed slot opening 40 (FIG. 1) between secondary beams 42, 44, directs some of the air flow away from the converging wedge on the underside of air-bearing platform 50 by diverting a certain portion of the air flow over stiffener 90. The surface of the underside of bend 82, at the leading edge of air-bearing platform 50, is preferably lapped flat to facilitate air flow thereunder at the converging wedge created at leading edge 192.

The integrated read/write head structure and flexure support of the present invention has a very low total mass in comparison with prior-art slider assemblies. Absent stiffener 90, Metglas ® substrate 22 and the air-bearing flying structure formed thereon have a mass of less than 6-milligrams. With stiffener 90 attached to the second side of air-bearing platform 50, the total mass of the structure is less than 10-milligrams. This compares with the mass of conventional air-bearing slider assemblies of approximately 300-milligrams. Because of its low mass, the integrated structure of the present invention offers a fast "seek and settle time" of less than 20-milliseconds. The air-bearing platform is designed to have a fly height of approximately 5-microinches, substantially less than the industry average of 10-microinches for conventional sliders. At 5 microinches from the media disc, the integrated flexure assembly of the present invention is positioned in very stable air flow below the height of the mean free path of the air molecules, the means free path of air molecules being approximately 10-microinches. Consequently, the air flow is very stable at 5-microinches and the flying position of the air-bearing platform is correspondently stable. Because the air-bearing platform employs negative loading, there is no contact between the heads and magnetic media. In addition, the integrated flexure assembly is self loading, meaning that it automatically positions itself at the correct fly height without additional mechanical devices to pre-position the air-bearings.

One particular advantage of fabricating an air-bearing flying structure for read/write heads from a Metglas ® substrate is the dissipation of tribo-electric charge. Tribo-electric charge is created by frictional contact between surfaces of an air-bearing slider and molecules of air. Such charge can produce pashen discharge which can damage both the media and the read/write heads of the slider. It also tends to cause dust particles or the like to cling to aerodynamic surfaces such as negative-pressure cavities formed in the slider. Eventually, an accumulation of such particles can adversely effect the aerodynamic flight characteristics of the slider or cause burnishing of the media and the slider.

The air-bearing flying structure of the present invention has an air-bearing surface at its closest approach to adjacent magnetic media which is entirely metallic and which tends to dissipate or neutralize tribo-electric charge. Consequently, the integrated structure of the present invention resolves the problem associated with tribo-electrification. This is accomplished because the integrated structure 20 provides a body of tribo-electrically neutral material on the first air-bearing surface 84 of platform 50. The air-bearing surface of platform 50 is configured to ride upon air currents adjacent the moving media, and maintains its first surface in spaced-apart relation to the media when the media is moving. In the present invention, the surface subject tribo-electrification and harmful discharge is entirely covered with Metglas ®. Consequently, the body of the air-bearing structure, meaning platform 50, is formed of tribo electrically neutral or tribo-electrically dissipating material. As such, the at least one read/write head formed on this body of tribo-electrically neutral material, while optimally positioned to interact magnetically with the adjacent media, will not be damaged by tribo-electrical discharge.

Although stiffener 90 is formed of ceramic material which might accumulate tribo-electric charge, the critical air-bearing surface of the slider, facing the adjacent moving magnetic media, completely isolates the stiffener from tribo-electrification. Furthermore, the Metglas ® substrate is sufficiently electrically conductive to drain off static charge produced by frictional contact between the body of air-bearing platform 50, the moving air molecules and the adjacent magnetic media.

Alternative embodiments are possible within the scope of the present invention. For example, the exact configuration of beams which form the air-bearing flexure support is a matter of design choice and may be readily modified to accommodate different preferred fly heights and to accommodate different media speeds. The interconnect conductors between the read/write heads formed on the air-bearing rails could be provided by external wires or another means, rather than integral conductors formed in the body of the Metglas ®substrate. The composition of the stiffener could be changed within the scope of the present invention. For example, stiffener 90 could be formed of an iron composition or another suitable, hard substance which would effectively stiffen the air-bearing platform. Although a particular configuration has been shown for the air-bearing flying structure of the present invention, the architecture could be changed within the scope of the present invention. For example, the number of flexure beams could be changed. It is only important that at least one of the pair of beam structures be provided. Similarly, the invention provides that at least one of the read/write head transducers be formed on the air-bearing flying structure, including at least one magnetic pole formed integrally with the substrate and at least one secondary magnetic pole joined to the substrate in operative association with the at least one pole to form a head structure in accordance with the present invention.

The functional configuration of the flexure means supporting the air-bearing platform is a matter of design choice which could be changed within the scope of the present invention. For example, the integrated read/write head and flexure support assembly, while described in terms of a self-loading mounting which maintains the heads and air-bearing surface spaced from the media, could alternatively be formed in a positive-loading configuration. To achieve positive loading, the primary beams 30, 32 would be statically loaded to press downwardly from a mounting support arm, causing the air-bearing platform to rest directly on the media. As the media reaches its operating speed, the air-bearing platform will then be pushed off the disc against the spring force of the flexure support into a stable operating position. Positive loading could also be effected by forming additional bends in the primary flexure beams, to press the air-bearing surface onto the media. The flight characteristics of the air-bearing surface, when operating in its final stable orientation, will be exactly the same whether the flexure support is configured for positive-loading or negative-loading. Other changes and modifications in the integrated read/write and flexure support structure of the present invention will occur to those skilled in the art.

Since almost the entire integrated structure is manufactured using photolithography techniques, with only the stiffener externally affixed to the assembly, the structure can be mass produced at low expense in comparison with prior art multi-part slider assemblies.

What is claimed is:

1. An integrated read/write structure for magnetic media comprising:
   a sheet of flexible magnetic material having integrated therein:
   at least one magnetic pole,
   an air-bearing flying structure, a flexure assembly, said air-bearing structure being supported by said flexure assembly,
   at least one second magnetic pole joined to said magnetic sheet material in operative association with said at least one pole, said poles being supported on a first surface of said air-bearing flying structure for interacting magnetically with a planar magnetic media moving parallel with and facing said first surface, said flexure assembly allowing positioning of said air-bearing flying structure at an optimal distance from said media, and
   an electrical coil formed in said magnetic sheet material operatively associated with said poles.

2. A read/write structure as in claim 1 in which said sheet of flexible magnetic material is Metglas ®.

3. A read/write structure as in claim 1 in which the overall mass of the read/write structure is in the range of between about 3-milligrams and about 15-milligrams.

4. A read/write structure as in claim 1 including electrical conductors formed in said magnetic sheet material for selectively energizing said electrical coil means.

5. A read/write structure as in claim 4 in which said sheet of magnetic material includes a mounting end for attaching the read/write structure to an external support, said flexure means including a parallel beam support for said air-bearing flying structure, and said electrical conductors extend from interconnection pads formed adjacent said mounting end along said parallel beam support to said air-bearing flying structure, said poles and said electrical coil means being supported on said air-bearing flying structure.

6. A read/write structure as in claim 1 in which said sheet of magnetic material includes a pattern of removed sheet material to form said air-bearing flying structure and said flexure means.

7. A read/write structure as in claim 6 in which said flexure means includes parallel beams which support said air-bearing flying structure.

8. A read/write structure as in claim 7 in which said sheet of magnetic material includes a mounting end for attaching the read/write structure to an external support, and a free end opposite said mounting end, said parallel beams including at least one primary beam extending from said mounting end to said free end, and at least one secondary beam supported at one end from said primary beam adjacent said free end and attached to said air-bearing flying structure at the other end, the flexure of said beams and resilient movement therebetween providing flexure support for said air-bearing flying structure.

9. A read/write structure as in claim 7 in which said air-bearing flying structure includes a first surface for facing adjacent magnetic media, said magnetic poles being on said first surface, and a second surface facing opposite said first surface, the read/write structure further including a stiffener attached to said second surface of said air-bearing flying structure to maintain a generally flat, planar shape to said air-bearing flying structure.

10. A read/write structure as in claim 7 in which said air-bearing flying structure includes means defining at least one rail and an adjacent recessed area on a first surface thereof, said poles being supported on said rail for interacting magnetically with planar magnetic media moving parallel with and facing said first surface, said air-bearing flying structure and said beams being configured to direct a portion of the air flowing adjacent moving media between said first surface and the media, whereby air flows adjacent said rail and said recessed area to produce respective above-ambient and below-ambient air pressure zones between said first surface and the media to assist in controlling the fly height of the air-bearing flying structure relative to the media.

11. A read/write structure as in claim 10 in which said at least one rail is a longitudinally-extending area of said magnetic sheet material of greater thickness than adjacent areas of said firs surface, and wherein, when the read/write structure is adjacent moving magnetic media and oriented such that air flows between said first surface and the media, said rail is oriented generally parallel with the direction of air flow.

12. A read/write structure as in claim 11 in which at least two said rails are formed on said first surface, said at least two rails being mutually parallel and said recess being between said rails.

13. A read/write structure as in claim 7 in which said sheet of magnetic material includes a mounting end for attaching the read/write structure to an external support, and a free end opposite said mounting end, said structure being mountable from said mounting end on an external support in cantilever fashion such that it extends generally parallel to planar magnetic media moving relative thereto with said free end extending into the air flow adjacent the magnetic media, the parallel beams converging and being joined together adjacent said free end whereby air flow adjacent the media exerts air pressure on and around the beams to help position the air-bearing flying structure relative to the media.

14. A read/write structure as in claim 13 in which, when the read/write structure is adjacent moving magnetic media and oriented such that one or more of said beams extends from said pole platform into the air flow adjacent the media, said air-bearing flying structure, and the one or more beams extending therefrom, are configured to direct a portion of the air flow into a positive pressure region between the media and a first surface of said air-bearing flying structure facing the media, whereby above-ambient air pressure in said positive pressure region urges the air-bearing flying structure away from the media.

15. A read/write structure as in claim 14 in which said air-bearing flying structure includes means forming a recess in said first surface of said air-bearing flying structure which, when the read/write structure is adjacent moving recording media, creates below-ambient air pressure in a negative pressure region adjacent said recess, whereby the below-ambient air pressure urges the air-bearing flying structure toward the media.

16. A read/write structure as in claim 15 in which said sheet of flexible material, including said beams and portions of said air-bearing flying structure, is approximately 30-microinches thick, and said recess in said first surface is approximately 4.5-microinches deep.

17. An integrated magnetic head and flying support structure for attachment to a positioning arm adjacent planar magnetic media moving relative thereto, the integrated structure comprising:

at least one flexure beam and an air-bearing platform including at least one magnetic pole supported by said at least one flexure beam integrally formed in a unitary sheet of thin, flexible magnetic material, a second magnetic pole juxtaposed with respect to each at least one magnetic pole on said air-bearing platform, each pair of juxtaposed poles defining a read/write head gap on a first surface of said air-bearing platform,
an electrical coil on said air-bearing platform operatively associated with said poles, and
at least a portion of the integrated air-bearing platform and flexure beams being configured to direct air flowing adjacent magnetic media moving relative thereto between said first surface and the media.

18. A read/write structure as in claim 17 in which said air-bearing platform includes a first surface for facing adjacent magnetic media, said magnetic poles being on said first surface, and a second surface facing opposite said first surface, the read/write further including a stiffener attached to said second surface of said air-bearing platform to maintain a generally flat, planar shape to said air-bearing platform.

19. An integrated structure as in claim 17 in which the flexible magnetic sheet material forming said air-bearing platform and said at least one flexure beam is an amorphous metallic material resistant to tribo-electrification.

20. An integrated structure as in claim 17 in which the flexible magnetic sheet material forming said air-bearing platform and flexure beams is Metglas ®.

21. A read/write structure as in claim 17 in which the overall mass of the read/write structure is in the range of between about 3-milligrams and about 15-milligrams.

22. An integrated structure as in claim 17 in which at least one flexure beam for supporting said air-bearing platform includes at least one primary beam extending longitudinally between a mounting end where the integrated structure is attached to a positioning arm and an unattached free end, said air-bearing platform being supported from adjacent said free end of said primary beam.

23. An integrated structure as in claim 22 in which at least one flexure beam include at least one secondary beam extending from adjacent said free end of said primary beam toward said air-bearing platform, whereby said air-bearing platform forms a flexure connection with said primary beam through said secondary beam.

24. An integrated structure as in claim 23 including a pair of generally parallel primary beams, a cross leg connecting said primary beams adjacent said free end, and a pair of generally parallel secondary beams extending from said cross leg between said primary beams toward said mounting end, all formed in said unitary sheet of magnetic material, whereby said air-bearing platform is between said primary beams.

25. An integrated structure as in claim 17 including means forming at least one negative-pressure recess on said first surface of said air-bearing platform for producing below-ambient pressure in air flowing adjacent thereto between said first surface and the magnetic medium, whereby said air-bearing platform is urged by the below-ambient pressure toward magnetic media moving relative thereto.

26. An integrated structure as in claim 25 including at least one air-bearing rail on said first surface for producing above-ambient pressure in air flowing adjacent thereto between said first surface and moving magnetic media.

27. An integrated structure as in claim 26 in which at least one flexure beam for supporting said air-bearing platform ,includes at least one primary beam extending longitudinally between a mounting end where the integrated structure is attached to a positioning arm and an unattached free end, said air-bearing platform being supported from adjacent said free end of said primary beam, and said at least one air-bearing rail on said first surface extends generally parallel to said primary beam.

28. An integrated structure as in claim 26 together with positioner means for urging said air-bearing platform toward adjacent magnetic media against the flexure of at least one flexure beam to a rest position spaced from the magnetic media, whereby said air-bearing platform is held in said rest position by said positioner means when the relative motion of the media is insufficient to produce an air flow which urges said air-bearing platform closer to the media, and said air-bearing platform is drawn toward the magnetic media to predetermined fly height by the air adjacent said negative-pressure recess when the media has sufficient relative motion.

29. An integrated structure as in claim 28 in which said first surface of said air-bearing structure is spaced between about 8-microinches and about 16-microinches from the surface of the magnetic media when in said rest position.

* * * * *